United States Patent [19]

Wada

[11] Patent Number: 4,511,828
[45] Date of Patent: Apr. 16, 1985

[54] D.C. COMMUTATORLESS ELECTRIC MOTOR

[75] Inventor: Kinzo Wada, Yokohama, Japan

[73] Assignee: Victor Company of Japan, Ltd., Japan

[21] Appl. No.: 459,222

[22] Filed: Jan. 20, 1983

[30] Foreign Application Priority Data

Jan. 22, 1982 [JP] Japan ................................ 57-8487

[51] Int. Cl.³ ........................ H02P 6/02; H02K 29/02
[52] U.S. Cl. .................................. 318/254; 318/138; 318/439
[58] Field of Search .................. 318/254 A, 254, 138, 318/439

[56] References Cited

U.S. PATENT DOCUMENTS

| 3,440,506 | 4/1969 | Krestel et al. | 318/254 A X |
| 3,448,359 | 6/1969 | Engel | 318/254 A X |
| 4,143,308 | 3/1979 | Deplante et al. | 318/254 X |

FOREIGN PATENT DOCUMENTS

| 2105932 | 3/1983 | United Kingdom | 318/254 |

*Primary Examiner*—J. V. Truhe
*Assistant Examiner*—Bentsu Ro
*Attorney, Agent, or Firm*—Andrus, Sceales, Starke & Sawall

[57] ABSTRACT

A D.C. commutatorless electric motor comprises a rotor having a permanent magnet, first and second Hall elements for detecting rotational angle of the rotor according a magnetic field formed by the permanent magnet of the rotor, first and second stator coils respectively coupled to the first Hall element through first and second switching elements, third and fourth stator coils respectively coupled to the second Hall element through third and fourth switching elements, first impedance control element for controlling impedances of the first and second switching elements, and a second impedance control element for controlling impedances of the third and fourth switching elements. One terminal of the first and second stator coils is coupled to a positive power source terminal, and the other terminal of the first and second stator coils is coupled at a common connection point to the third and fourth stator coils which have one terminal coupled to a negative power source terminal. The first impedance control element is coupled to the common connection point.

2 Claims, 6 Drawing Figures

D.C. COMMUTATORLESS ELECTRIC MOTOR

BACKGROUND OF THE INVENTION

The present invention generally relates to D.C. commutatorless electric motors, and more particularly to a D.C. commutatorless electric motor designed so that a rotor can be driven smoothly regardless of inconsistencies in the characteristic of rotor position detecting means, and power consumption of switching elements is low.

Generally, a so-called Hall motor employing Hall elements, is widely used as a D.C. commutatorless electric motor. However, as will be described hereinafter in conjunction with the drawings, the conventional Hall motor was disadvantageous in that torque ripple and inconsistent rotation are introduced when the product sensitivities of the Hall elements are unbalanced and results in unstable rotation of the motor. In addition, when there is inconsistency in the temperature coefficient of each of the Hall elements, angles corresponding to intervals in which the coil currents flow become unequal due to change in the ambient temperature, to introduce torque ripple and inconsistent rotation. Furthermore, in the conventional Hall motor, the required total control current for the Hall elements is two times the control current required with respect to one Hall element, because the Hall elements are coupled in parallel with respect to a power source. Accordingly, the power consumption of the conventional Hall motor is high, and is thus unfit for use as a motor of a device which uses a battery as its power source.

In addition, in a record player, for example, there are cases where a record disc is placed onto a turntable which is directly driven and rotated by a phonograph motor, and the rotation of the turntable is interrupted by the operator's hand to clean the surface of the record disc in a state in which a power source is driving the phonograph motor, although this is an undesirable method of operating the record player. In such a case, a rotor of the motor is in a locked state (hereinafter referred to as a rotor lock state), and large currents are applied to power transistors. These large currents applied to the power transistors are exceedingly larger than the currents applied to the power transistors when the rotor is rotating normally, and the collector losses are large. Hence, power transistors having large maximum collector losses had to be used as the power transistors, and the cost of the device became high.

SUMMARY OF THE INVENTION

Accordingly, it is a general object of the present invention to provide a novel and useful D.C. commutatorless electric motor in which the above described disadvantages have been eliminated.

Another and more specific object of the present invention is to provide a D.C. commutatorless electric motor in which an angle corresponding to an interval in which a stator coil current flows is constant regardless of unequal product sensitivity of each of Hall elements, unequal D.C. voltage potential at voltage terminals of the Hall elements, unequal output waveforms of the Hall elements, and the like, and torque ripple and inconsistent rotation are not introduced.

Still another object of the present invention is to provide a D.C. commutatorless electric motor in which rotor position detecting means is coupled in series with respect to a power source. According to the motor of the present invention, a control current for the rotor position detecting means may be small, and the power consumption is hence low. The motor according to the present invention is thus effective when used in devices using a battery as the power source.

Another object of the present invention is to provide a D.C. commutatorless electric motor provided with means for controlling impedances of first and second switching elements according to a voltage at a common terminal. According to the motor of the present invention, the voltage at the common terminal may be fixed to a value which is substantially $\frac{1}{2}$ the power source voltage, and the maximum power consumption of four switching elements may be reduced to substantially $\frac{1}{2}$ the maximum power consumption of a conventional circuit which is not provided with the impedance controlling means (in a case where starting torque and starting current are the same in the motor according to the present invention and the conventional motor).

Still another object of the present invention is to provide a D.C. commutatorless electric motor in which switching elements having low maximum allowable voltages may be used, to allow cost reduction of the motor as compared to conventional motors.

Other objects and further features of the present invention will be apparent from the following detailed description when read in conjunction with the accompanying drawings.

DETAILED DESCRIPTION

Figure 1A:
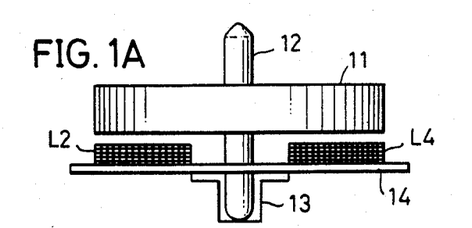
FIGS. 1A and 1B are a general plan view showing a general D.C. commutatorless electric motor and a diagram showing positional relationship of stator coils and Hall elements.
Figure 1B:
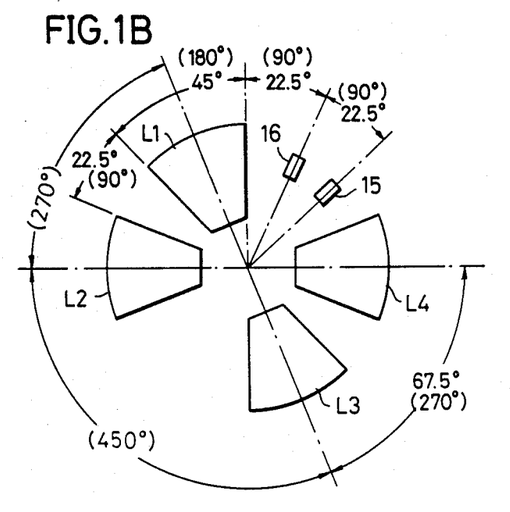

As shown in FIG. 1A, a general D.C. commutatorless electric motor comprises a rotor 11 including a permanent magnet having eight poles, a rotary shaft 12 fixed to the rotor 11 and axially supported by a bearing 13, and stator coils $L_1$ through $L_4$ fixed to a base plate 14. The stator coils $L_1$ through $L_4$ are provided opposing the magnetized surface of the rotor 11. The coils $L_1$ and $L_2$, and the coils $L_3$ and $L_4$, are respectively arranged with a difference of $3\pi/2$ radians in electrical angle, that is, a 270° phase difference, as shown in FIG. 1B. On the other hand, the coils $L_2$ and $L_3$, and the coils $L_4$ and $L_1$, are respectively arranged with a a difference of $5\pi/2$ radians in electrical angle, that is, a 450° phase difference. Hall elements 15 and 16 are mounted onto the base plate 14 with a difference of $\pi/2$ radians in electrical angle, that is, a 90° phase difference. The Hall element 15 and the coil $L_4$, and the Hall element 16 and the coil $L_1$, are respectively arranged with a difference of $\pi$ radians in electrical angle, that is, a 180° phase difference. In FIG. 1B, angles shown in brackets indicate electrical angles, and angles without brackets indicate mechanical angles.

Figure 2:
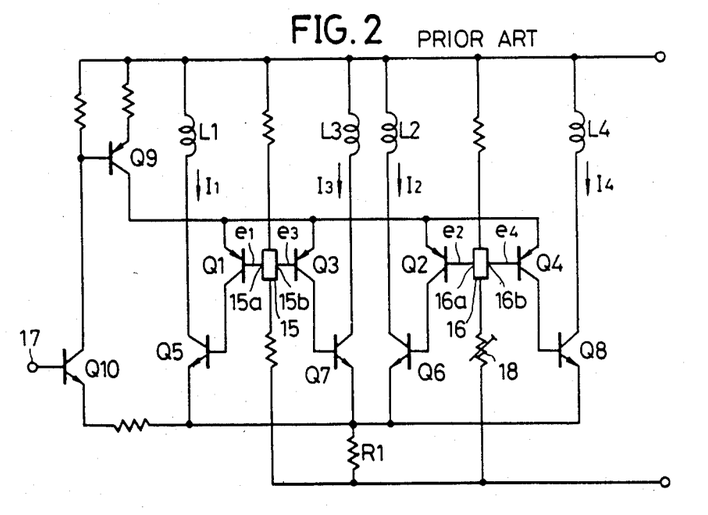
FIG. 2 is a circuit diagram showing an example of a driving circuit for a conventional D.C. commutatorless electric motor.
Figure 3:
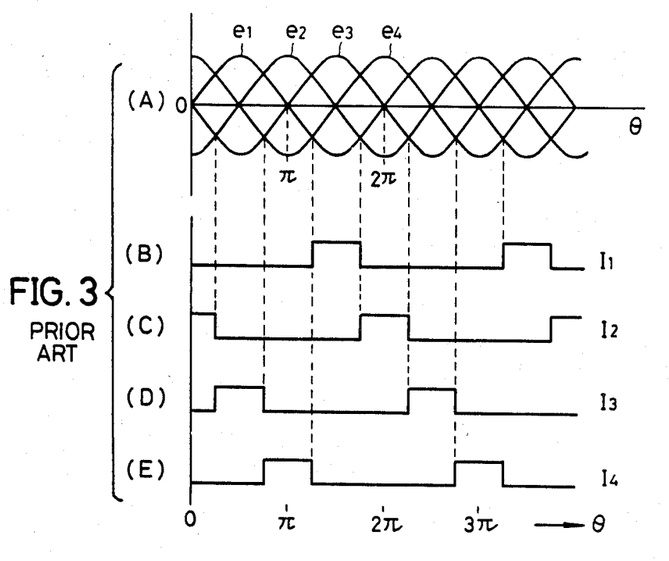
FIG. 3 is graphs showing signal waveforms at each part of the circuit shown in FIG. 2.

A conventional example of a driving circuit for the general D.C. commutatorless electric motor which has the above described construction, is shown in FIG. 2. When a current is applied to current terminals of the Hall elements 15 and 16, Hall output voltages $e_1$, $e_3$, $e_2$, and $e_4$ shown in FIG. 3(A) are respectively obtained through voltage terminals 15a, 15b, 16a, and 16b of the Hall elements 15 and 16. Transistors Q1 through Q4 are respectively turned ON during a partial period corresponding to approximately $\pi/2$ of a negative voltage period of the respective Hall output voltages $e_1$ through $e_4$, that is, during a period when the voltages $e_1$ through $e_4$ respectively are lowest. Transistors Q5 through Q8 are turned ON due to the ON states of the transistors Q1 through Q4. As a result, coil currents $I_1$ through $I_4$ shown in FIGS. 3(B) through 3(E) are successively and time-divisionally applied to the respective stator coils $L_1$ through $L_4$ according to the rotation of the rotor 11, to rotate the rotor 11 in one direction. In this state, amplitudes of the coil currents $I_1$ through $I_4$ are controlled by a speed error signal which is in accordance with the rotational speed of the rotor 11 and obtained through a terminal 17, to control the rotational speed of the rotor 11.

In the conventional motor, the periods in which the coil currents $I_1$ through $I_4$ are applied to the respective stator coils $L_1$ through $L_4$, correspond to periods in which the Hall output voltages $e_1$ through $e_4$ assume lowest values. Thus, due to unbalanced product sensitivity and the like of the Hall elements 15 and 16, the angle corresponding to an interval in which the coil current $I_1$ flows becomes large if the amplitude of the Hall output voltage $e_1$ ($e_3$) becomes large compared to the amplitude of the Hall output voltage $e_2$ ($e_4$), for example. This phenomenon will also occur when if D.C. potentials at the voltage terminals of the Hall elements 15 and 16 are unbalanced, or if the Hall output waveforms are unbalanced. These unbalanced states causes increase in the torque ripple and inconsistent rotation, and gives rise to a problem in that the motor cannot be positively driven.

In order to minimize the undesirable effects described above, the motor is designed so that the angles corresponding to the intervals in which each of the coil currents $I_1$ through $I_4$ flow may be corrected at a predetermined ambient temperature by a resistor 18. However, in a case where the Hall elements is formed from indium antimony, for example, the output voltages and input resistances of the Hall elements change at a rate of approximately $-2\%/°C$. to $-3\%/°C$. according to the temperature. Moreover, the temperature coefficients are inconsistent among Hall elements. For this reason, the angles corresponding to the intervals in which the coil currents $I_1$ through $I_4$ flow become unequal according to the change in temperature, and it was impossible to completely eliminate the torque ripple and the inconsistent rotation.

Further, in the conventional driving circuit described heretofore, the Hall elements 15 and 16 are coupled in parallel to the voltage source, and the total control current for the Hall elements must be two times the control current for one Hall element. Thus, the power consumption became high as described before, and the motor was unfit for a motor used in devices which uses a battery as the power source.

In addition, when the motor is used for the phonograph motor of the record player as described before and the rotor is in a so-called rotor locked state where the rotation of the rotor is forcibly interrupted, currents in a range of 500 mA which are the same as the currents applied to the power transistors Q5 through Q8 are applied to the transistors Q5 through Q8. On the other hand, upon normal rotation of the rotor, the currents applied to the transistors Q5 through Q8 are in a range of 30 mA. Hence, the currents applied to the power transistors in the rotor locked state are exceedingly large compared to the currents applied to the power transistors upon normal rotation of the rotor, and the collector losses of the power transistors are large. Therefore, transistors having characteristics which will withstand the collector losses in the rotor locked state, are used for the power transistors.

If a resistance of one stator coil is designated by R10, a starting current applied thereto by $I_{s1}$, and a power source voltage by E in the conventional circuit, a resistor R1 connected to emitters of the transistors Q5 through Q8 may be neglected since $R10 >> R1$. Hence, a collector loss $P_{c1}$ in one of the transistors Q5 through Q8 when the rotor 11 is in the rotor locked state, becomes as follows.

$$P_{c1} = i_{s1}(E - R10 \cdot i_{s1}) = -R10(i_{s1} - E/2R10)^2 + E^2/4R10$$

Thus, a maximum collector loss $P_{cm1}$ may be defined by equation (1) below.

$$P_{cm1} = E^2/4R10 \qquad (1)$$

This maximum collector loss $P_{cm1}$ is two times the maximum collector loss of a circuit in a motor according to the present invention which will be described hereinafter. Hence, the conventional circuit was disadvantageous in that transistors having large maximum collector losses must be used for the power transistors, and the cost of the circuit is high.

The present invention has overcome the disadvantages of the conventional circuit described heretofore, and an embodiment of the present invention will now be described in conjunction with FIG. 4.

Figure 4:
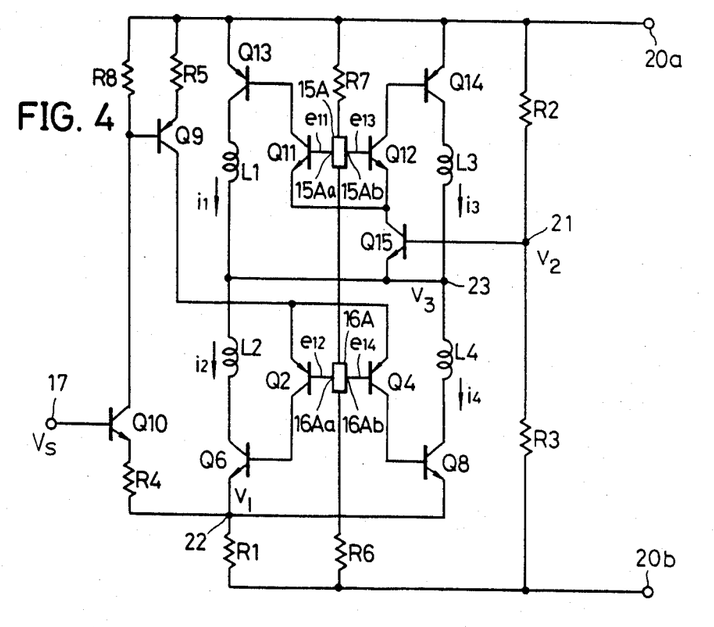
FIG. 4 is a circuit diagram showing an embodiment of a driving circuit of a D.C. commutatorless electric motor according to the present invention.

FIG. 4 is a circuit diagram showing an embodiment of a D.C. commutatorless electric motor according to the present invention. In FIG. 4, mounting positions of Hall elements 15A and 15B and the stator coils $L_1$ through $L_4$ are the same as the Hall elements 15 and 16 and the stator coils $L_1$ through $L_4$ shown in FIGS. 1A and 1B, and those parts which are the same as those corresponding parts in FIGS. 1A and 1B are designated by the same reference numerals.

One ends of the coils $L_1$ and $L_3$ are respectively connected to collectors of PNP type transistors Q13 and Q14. Bases of NPN type transistors Q11 and Q12 are respectively connected to voltage terminals 15Aa and 15Ab of the Hall element 15A, and collectors of the transistors Q11 and Q12 are respectively connected to bases of the transistors Q13 and Q14. Emitters of the transistors Q11 and Q12 are commonly connected to a collector of a transistor Q15. The other ends of the coils $L_1$ and $L_3$ are commonly connected to an emitter of the transistor Q15 and also to one ends of the coils $L_2$ and $L_4$. A connection point between the other ends of the coils $L_1$ and $L_3$ and the emitter of the transistor Q15 and the one ends of the coils $L_2$ and $L_4$, is shown as a connection point 23 in FIG. 4.

The other ends of the coils $L_2$ and $L_4$ are respectively connected to collectors of the NPN type transistors Q6 and Q8. Bases of the PNP type transistors Q2 and Q4 are respectively connected to voltage terminals 16A$a$ and 16A$b$ of the Hall element 16A, and emitters of the transistors Q2 and Q4 are commonly connected to a collector of a transistor Q9. Collectors of the transistors Q2 and Q4 are respectively connected to bases of the transistors Q6 and Q8.

Resistors R2 and R3 are connected between power source terminals 20$a$ and 20$b$, and a base of the transistor Q15 is connected to a connection point 21 of these resistors R2 and R3. One current terminal of the Hall element 15A is connected to the positive power source terminal 20$a$ through a resistor R7, while the other current terminal of the Hall element 15A is connected to one current terminal of the Hall element 16A. The other current terminal of the Hall element 16A is connected to the negative power source terminal 20$b$ through a resistor R6. The emitters of the transistors Q6 and Q8 are directly connected to a connection point 22, while an emitter of a transistor Q10 is connected to the connection point 22 through a resistor R4. This connection point 22 is connected to the power source terminal 20$b$ through the resistor R1. Emitter and base of the transistor Q9 are connected to the power source terminal 20$a$, through respective resistors R5 and R8. Collector and base of the transistor Q10 are respectively connected to the base of the transistor Q9 and the terminal 17.

Figure 5:
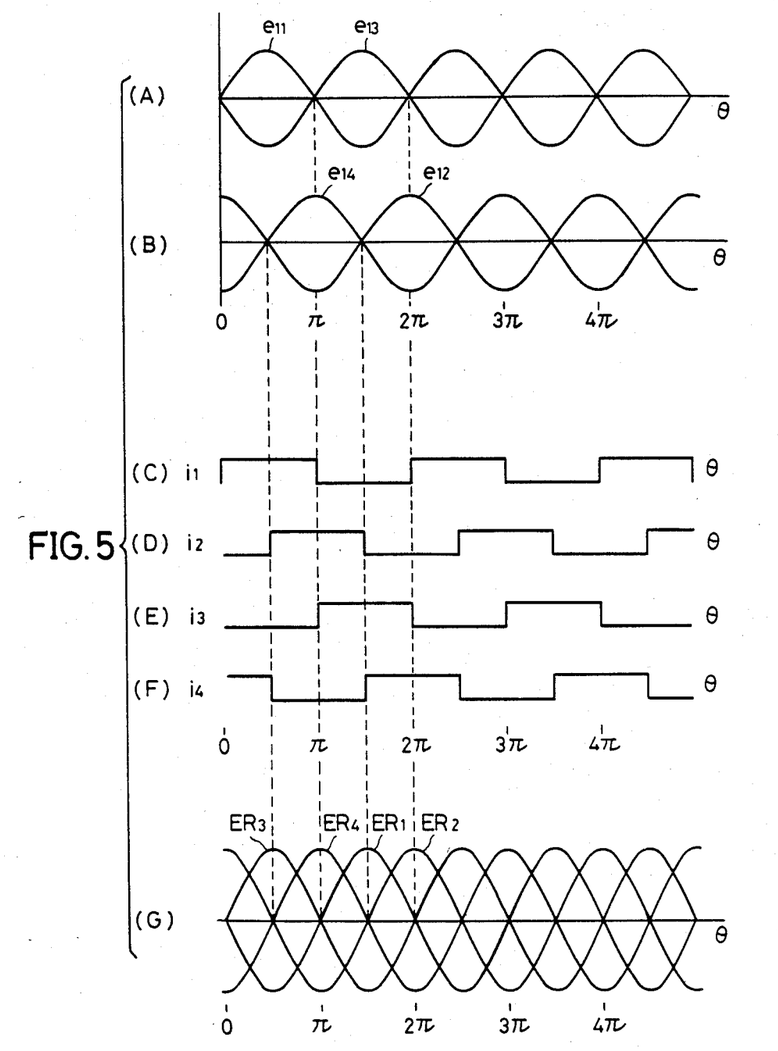
FIG. 5 is graphs showing signal waveforms at each part of the circuit shown in FIG. 4.

When currents are applied to the current terminals of the Hall elements 15A and 16A and the rotor rotates, Hall voltages $e_{11}$ and $e_{13}$ shown in FIG. 5(A) are respectively obtained from the voltage terminals 15A$a$ and 15A$b$ of the Hall element 15$a$, and Hall voltages $e_{12}$ and $e_{14}$ shown in FIG. 5(B) are respectively obtained from the voltage terminals 16A$a$ and 16A$b$ of the Hall element 16A. In FIGS. 5(A) through 5(G), a horizontal axis $\theta$ indicates the rotational angle of the rotor in electrical angle.

The transistor Q11 is ON during a high voltage period of the Hall voltage $e_{11}$, that is a period corresponding to $\pi$ radians in electrical angle when $e_{11} > e_{13}$, and OFF during other periods. The transistor Q12 is ON during a high voltage period of the Hall voltage $e_{13}$ when $e_{13} > e_{11}$, and OFF during other periods. The transistor Q2 is ON during a low voltage period of the Hall voltage $e_{12}$, that is, a period corresponding to $\pi$ radians in electrical angle when $e_{12} < e_{14}$, and OFF during other periods. In addition, the transistor Q4 is ON during a low voltage period of the Hall voltage $e_{14}$ when $e_{14} < e_{12}$, and OFF during other periods. Accordingly, The transistors Q13 and Q14 are ON during the high voltage periods of the Hall voltages $e_{11}$ and $e_{13}$, and OFF during low voltage periods of the Hall voltages $e_{11}$ and $e_{13}$. On the other hand, the transistors Q6 and Q8 are ON during the low voltage periods of the Hall voltages $e_{12}$ and $e_{14}$, and OFF during the high voltage periods of the Hall voltages $e_{12}$ and $e_{14}$.

As shown in FIGS. 5(C) through 5(F), during a period in which the rotational angle of the rotor is zero to $\pi/2$ radians in electrical angle, for example, the transistors Q13 and Q8 are ON and the transistors Q6 and Q14 are OFF. Hence, during this period, a current from the positive power source terminal 20$a$ passes through the transistor Q13, coils $L_1$ and $L_4$, transistor Q8, and resistor R1, to flow to the negative power source terminal 20$b$. That is, a current $i_1$ flows through the coil $L_1$, and a current $i_4$ flows through the coil $L_4$. During a succeeding period in which the rotational angle is $\pi/2$ to $\pi$ radians in electrical angle, the transistors Q13 and Q6 are ON, and the transistors Q14 and Q8 are OFF. Thus, during this succeeding period, a current from the positive power source terminal 20$a$ passes through the transistor Q13, coils $L_1$ and $L_2$, transistor Q6, and resistor R1, to flow to the negative power source terminal 20$b$. That is, the current $i_1$ flows through the coil $L_1$, and a current $i_2$ flows through the coil $L_2$. During other periods, currents $i_1$ through $i_4$ shown in FIGS. 5(C) through 5(F) flow through respective coils $L_1$ through $L_4$, according to operations similar to those described above. FIGS. 5(C) through 5(F) are illustrated as if the currents are respectively switched within an exceedingly short period of time, however, these figures are merely illustrated to facilitate the understanding of the switching of currents, and the actual switching of currents are carried out more slowly.

On the other hand, counterelectromotive forces $ER_1$, $ER_2$, $ER_3$, and $ER_4$ shown in FIG. 5(G) are respectively generated at the coils $L_1$ through $L_4$. In the waveforms shown in FIG. 5(G), the counterelectromotive forces $ER_1$ and $ER_3$ are forces respectively measured with respect to the collectors of the transistors Q13 and Q14, and the counterelectromotive forces $ER_2$ and $ER_4$ are forces respectively measured with respect to the common connection point 23 of the coils.

As the rotor 11 rotates, the collector currents of the transistors Q10 and Q9 are controlled according to a voltage difference between a speed error signal $V_S$ applied to the terminal 17 and a terminal voltage $V_1$ of the resistor R1. On the other hand, the emitter currents of the transistors Q11 and Q12 are controlled according to the collector current of the transistor Q15. In this case, the collector current of the transistor Q15 is controlled according to a voltage difference between a bias voltage $V_2$ at the connection point 21 which is obtained by the voltage division by the resistors R2 and R3 and a voltage $V_3$ at the common connection point 23 of the coils. The following relation stands between a base-emitter voltage $V_{15}$ of the transistor Q15 and the voltages $V_2$ and $V_3$.

$$V_2 - V_{15} \approx V_3$$

That is, when the voltage $V_3$ tend to become lower (higher) than a voltage $(V_2 - V_{15})$ due to change in the speed error signal $V_S$, changes in current amplification of the transistors Q6 and Q8 (Q13 and Q14), and the like, the collector current of the transistor Q15 becomes high (low), and emitter-collector impedances of the transistors Q13 and Q14 decreases (increases). As a result, the voltage $V_3$ is controlled so as to become high (low), and the voltage $V_3$ at the common connection point 23 is constantly controlled to a substantially constant value. The impedance of the transistors Q13 and Q14 are thus controlled according to the difference between the voltage $V_3$ at the common connection point 23 and the voltage $V_2$.

On the other hand, the transistors Q6 and Q8 repeat ON and OFF states according to the transistors Q2 and Q4 which are controlled according to the Hall voltages $e_{12}$ and $e_{14}$. The emitter currents of the transistors Q6 and Q8 are controlled according to the transistor Q10 which is controlled of its ON state by the incoming speed error signal $V_S$ supplied to the terminal 17. The base of this transistor Q10 is supplied to the speed error signal, and the voltage $V_1$ in accordance with the coil currents $i_1$ through $i_4$ is applied to the emitter of this transistor Q10 through the resistor R4. Hence, the amplitudes of the coil currents $i_1$ through $i_4$ are in accordance with the speed error signal $V_S$ and the currents flowing through the coils $L_1$ through $L_4$.

In the present embodiment of the invention, the transistors Q13, Q14, Q6, and Q8 which are respectively switched by the output voltages $e_{11}$ through $e_{14}$ of the Hall elements 15A and 16A and the coils $L_1$ through $L_4$, are connected as shown in FIG. 4. Therefore, as clearly seen from the Hall voltages $e_{11}$ through $e_{14}$ shown in FIGS. 5(A) and 5(B) and the coil currents $i_1$ through $i_4$ shown in FIGS. 5(C) through 5(F), the switching points where levels of the coil currents $i_1$ through $i_4$ are switched coincide with the zero crossings of the Hall voltages $e_1$ through $e_4$. For this reason, the unbalance in the product sensitivities of the Hall elements 15A and 16A, unbalance in the D.C. potential at the voltage terminals of the Hall elements, unbalance in the output waveforms of the Hall elements, and the like do not cause changes in the angles corresponding to the intervals in which the coil currents flow. Hence, according to the present embodiment, torque ripple, inconsistent rotation, and the like are prevented from being introduced due to inconsistencies in the Hall elements 15A and 16A.

In addition, according to the present embodiment, the control currents for the Hall elements may be $\frac{1}{2}$ the control currents required in the conventional circuit shown in FIG. 2, because the Hall elements 15A and 16A are coupled in series between the power source terminals. Thus, the present embodiment is especially suited for use in a battery-driven motor.

Next, discussions will be made on the maximum collector losses. It will be assumed that the starting torques and the starting currents are the same in the present embodiment and the conventional motor. If the resistance of one of the stator coils in the present embodiment is designated by R20, the following equation stands because the starting currents constantly flow through two coils connected in series according to the present embodiment, and the starting currents are the same in the present embodiment and the conventional motor.

$$R20 = R10/2 \tag{2}$$

The following equations can be formed if the number of coil winding for one coil is designated by $N_2$ and the wire diameter of the winding by $r_2$ in the present embodiment, and the number of coil winding for one coil is designated by $N_1$ and the wire diameter of the winding by $r_1$ in the conventional motor, and the average diameter of the coils and the volume resisitivity of the coil windings of the present invention are respectively the same as those of the conventional motor and are designated by D and s.

$$R20 = s\frac{\pi D N_2}{\pi r_2^2} = sD\frac{N_2}{r_2^2}, \quad R10 = sD\frac{N_1}{r_1^2}$$

From these equations and the equation (2), the following equation (3) can be obtained.

$$\frac{N_2}{N_1} = \left(\frac{r_2}{r_1}\right)^2 \times \frac{1}{2} \tag{3}$$

Meanwhile, assuming that the flux linking with a stator coil, the current flowing through the stator coil, the number of the winding for the coil and the torque exerted by the current are designated by $\phi$, I, N and T, respectively, and that the flux varies as $\phi \propto \cos\theta$, the torque T can be expressed, as well known, by $T = kN\cdot\phi\cdot I = kN\cos\theta\cdot I$, where k is a constant. Hence, the starting torque T depends on the angle $\theta$ which the motor starts from. Accordingly, average starting torques should be compared in the conventional motor and the present embodiment.

The average starting torque $T_{s1}$ of the conventional motor for the duration $\theta = -\pi/4$ to $\pi/4$, during which the starting current $i_{s1}$ flows as $I_2$ through the coil L2 as seen from FIG. 3, can be expressed by $$T_{s1} = \int_{-\pi/4}^{\pi/4} [kN_1\cos\theta \cdot i_{s1}d\theta/(\pi/2)].$$

And the average starting torque $T_{s2}$ of the present embodiment for the duration $\theta = 0$ to $\pi/2$, for which the starting current $i_{s2}$ flows as $i_1$ and $i_4$ through the coils $L_1$ and $L_4$ as seen from FIG. 5, can be expressed by $$T_{s2} = \int_0^{\pi/2}\left[kN_2\left\{\cos\left(\theta - \frac{\pi}{2}\right) + \cos\theta\right\}i_{s2}d\theta/(\pi/2)\right]$$

because the phase of the current $i_1$ is delayed by $\pi/2$ with respect to the current $i_4$ as shown in FIG. 5, and the flux for the coil $L_1$ should be delayed, too.

Having been assumed that $i_{s2} = i_{s1}$, the average starting torques $T_{s2}$ and $T_{s1}$ can be described as following equations (4) and (5), letting $ki_{s2} = ki_{s1} = K$ where K is a constant.

$$T_{S1} = \int_{-\pi/4}^{\pi/4} [(KN_1\cos\theta d\theta)/(\pi/2)] \tag{4}$$

$$= 4K/\pi \int_0^{\pi/4} N_1\cos\theta d\theta$$

$$= (4KN_1/\pi)[\sin\theta]_0^{\pi/4}$$

$$= (4KN_1/\pi)\cdot(1/\sqrt{2})$$

$$T_{S2} = \int_0^{\pi/2}[KN_2(\sin\theta + \cos\theta)d\theta/(\pi/2)] \tag{5}$$

$$= (2KN_2\cdot\sqrt{2}/\pi)\int_0^{\pi/2}\sin(\theta + \pi/4)d\theta$$

$$= (2KN_2\cdot\sqrt{2}/\pi)[-\cos(\theta + \pi/4)]_0^{\pi/2}$$

$$= 4KN_2/\pi$$

According to a condition $T_{S1} = T_{S2}$ and the equations (4) and (5), the following equation can be formed.

$$(4KN_1/\pi) \cdot (1/\sqrt{2}) = 4KN_2/\pi \text{ or } N_2 = N_1/\sqrt{2} \qquad (6)$$

Hence, the following equation (7) can be formed from the equations (3) and (6).

$$r_2/r_1 = \sqrt{2N_2/N_1} = \sqrt[4]{2} \qquad (7)$$

That is, characteristics of the coils are selected to satisfy the equations (6) and (7), the starting torques and the starting currents become equal in the motor according to the present invention and the conventional motor.

Next, a maximum collector loss $P_{cm2}$ of the power transistors Q1 through Q4 is determined under the above condition where the rotor 11 is in the rotor locked state. In FIG. 4, a starting current $i_{S2}$ flows through the two stator coils connected in series, and can be described by the following equation.

$$i_{S2} = E/(R1 + 2R20)$$

Thus, equation (8) stands if $R1 << R20$.

$$i_{S2} \approx E/2R20 \qquad (8)$$

For convenience' sake, it will be assumed that collector saturation voltages of the transistors Q6 and Q8 are zero. In this case, the maximum base voltage of the transistor Q10 is set so that the starting current $i_{S2}$ defined in equation (8) flows therethrough. On the other hand, resistances of the resistors R2 and R3 are selected so that the voltage $V_3$ at the common connection point 23 becomes equal to substantially ½ the voltage E.

By selecting the circuit constants in this manner, the collector losses of the transistors Q13, Q14, Q6, and Q8 become maximum when the coil currents $i_1$ through $i_4$ are switched according to the outputs of the Hall elements 15A and 16A, that is, at the point when one-half of the starting current $i_{S2}$ flows through one of the two transistors connected in parallel and the other one-half of the current $i_{S2}$ flows through the other of these two transistors connected in parallel. The reason is as follows. For example, a point when $\theta = \pi/2$ radians corresponds to a stage when the stage changes from a first state where the coil currents $i_1$ and $i_4$ are flowing due to the ON states of the transistors Q13 and Q8 to a second state where the coil currents $i_1$ and $i_2$ flows due to the ON states of the transistors Q13 and Q6, as shown in FIGS. 5(D) and 5(F).

Actual switching of the currents from the coil L4 to the coil L2 is gradually carried out as described above. That is, at this stage, a portion of the starting current $i_{s2}$ flowing through the transistor Q13 flows through the transistor Q8 as the current $i_4$ while the remainder of the current $i_{s2}$ flows through the transistor Q6 as the current $i_2$.

Assuming that the ratio of the current portion flowing through the transistor Q8 to the whole starting current $i_{s2}$ is equal to M (where M varies continuously from 0 to 1), the collector loss $P_{c2}$ of the transistor Q8 can be described by the following equation (9).

$$P_{c2} \approx (E/2 - R20 \cdot M \cdot i_{S2}) M i_{S2} \qquad (9)$$

Equation (10) is formed by substituting equation (8) into equation (9).

$$\begin{aligned}
P_{c2} &\approx [E/2 - R20 \cdot M \cdot (E/2R20)](ME/2R20) \qquad (10)\\
&= (E/2 - ME/2) \cdot (ME/2R20)\\
&= (E^2/4)(1 - M) \cdot (M/R20)\\
&= (E^2/4R20) \cdot (M - M^2)\\
&= (E^2/4R20)[-(M - \tfrac{1}{2})^2 + \tfrac{1}{4}]
\end{aligned}$$

The equation (10) shows that the collector loss $P_{c2}$ becomes maximum when $M = \tfrac{1}{2}$, that is, when the one-half the current $i_{S2}$ flows through the transistor Q8 and the other half flows through the transistor Q6. Therefore, the maximum collector loss $P_{cm2}$ becomes as follows when the condition $M = \tfrac{1}{2}$ is substituted into equation (10).

$$P_{cm2} = E^2/16R20 \qquad (11)$$

Further, equation (12) can be formed if equation (2) is substituted into equation (11).

$$P_{cm2} = E^2/8R10 \qquad (12)$$

As clearly understood from equations (1) and (12), te maximum collector loss $P_{cm2}$ of the power transistors Q13, Q14, Q6, and Q8 when the rotor 11 is in the rotor locked state in the present embodiment of the invention, is ½ the maximum collector loss $P_{cm1}$ of the power transistors in the conventional circuit. Thus, it is possible to use transistors having considerably low collector losses for the power transistors, and considerably lowers the cost of the circuit as compared to the conventional circuit.

In FIG. 4, the transistor Q15 and the resistors R2 and R3 may be omitted. In this case, a resistor is connected between the common emitters of the transistors Q11 and Q12 and the common connection point 23. Moreover, the resistances of the resistors R6 and R7 connected to the Hall elements 15A and 16A are suitably selected, so that the voltage $V_3$ at the common connection point 23 becomes approximately equal to E/2.

In addition, the voltage $V_3$ at the common connection point 23 is not limited to the voltage E/2, and may be selected appropriately. In this case, the base currents of the transistors Q13 and Q14 may be effectively limited to a necessary minimum, although the the maximum collector losses of the transistors Q13, Q14, Q6, and Q8 cannot be set to a minimum. This effective limit to the base currents of the transistors Q13 and Q14 is not only effective in reducing the power consumption. That is, it is possible to suppress noise and vibrations introduced at the coils upon switching of the coil currents, because it takes slightly longer to switch the currents to the transistors Q13 and Q14 in this case.

Further, the present invention is not limited to these embodiments, but various variations and modifications may be made without departing from the scope of the present invention.

What is claimed is:

1. A D.C. commutatorless electric motor comprising:
a rotor having a permanent magnet;
first and second power source terminals for receiving a D.C. power supply;

first and second Hall elements for detecting rotational angle of said rotor according to a magnetic field formed by the permanent magnet of said rotor, the first and second Hall elements and resistors being connected in series between the first and second power source terminals;

first and second pairs of stator coils for rotating said rotor;

a first pair of switching elements each having a control electrode and being coupled between, one terminal of said first pair of stator coils which generate counter electromotive forces of mutually opposite polarities, and the first power source terminal, other terminal of said first pair of stator coils being commonly coupled to one terminal of said second pair of stator coils which generate counter-electromotive forces of mutually opposite polarities;

a second pair of switching elements each having a control electrode and being coupled between, other terminal of said second pair of stator coils, and the second power source terminal;

first impedance control circuit comprising a first pair of transistors each coupled between a voltage terminal of said first Hall element and the control electrode of said first pair of switching elements, for controlling ON-OFF state of the first pair of switching elements, and a first impedance control means coupled between said first pair of transistors and the commonly coupled terminals of the stator coils, for controlling impedances of said first pair of switching elements upon ON state thereof through said first pair of transistors in response to a difference between a predetermined potential and a potential at the commonly coupled terminals of the stator coils so that the potential at the commonly coupled terminals of the stator coils is held at a substantial center of potentials at the first and second power source terminals; and second impedance control circuit comprising a second pair of transistors each coupled between a voltage terminal of said second Hall element and the control electrode of said second pair of switching elements, for controlling ON-OFF state of the second pair of switching element, and a second impedance control means coupled to said second pair of transistors, for controlling impedances of said second pair of switching elements upon ON state thereof through said second pair of transistors in response to a control signal.

2. A D.C. commutatorless electric motor as claimed in claim 1 in which said first impedance control means comprises voltage dividing resistors coupled between said first and second power source terminals, for carrying out voltage division, and a fifth transistor, said fifth transistor having its base coupled to a connection point of said voltage dividing resistors, its collector coupled to said first pair of transistors, and its emitter coupled to said commonly connected terminals of said stator coils.

* * * * *

UNITED STATES PATENT AND TRADEMARK OFFICE
CERTIFICATE OF CORRECTION

PATENT NO. : 4,511,828

DATED : April 16, 1985

INVENTOR(S) : KINZO WADA

It is certified that error appears in the above-identified patent and that said Letters Patent is hereby corrected as shown below:

Column 5, Line 35, Delete "15a" and substitute therefor ---15A---

Column 8, Line 25, Delete $$T_{s1} = {}_{-\pi/4}^{\pi/4} [kN_1 \cos\theta \cdot i_{s1} d\theta/(\pi/2)].$$

and substitute therefor---

$$T_{s1} = \int_{-\pi/4}^{\pi/4} [kN_1 \cos\theta \cdot i_{s1} d\theta/(\pi/2)].$$

Column 8, Line 31, Delete $$T_{s2} = {}_0^{\pi/2} \left[ kN_2 \left( \cos\left(\theta - \frac{\pi}{2}\right) + \cos\theta \right) i_{s2} d\theta/(\pi/2) \right]$$

and substitute therefor---

$$T_{s2} = \int_0^{\pi/2} \left[ kN_2 \left( \cos\left(\theta - \frac{\pi}{2}\right) + \cos\theta \right) i_{s2} d\theta/(\pi/2) \right]$$

UNITED STATES PATENT AND TRADEMARK OFFICE
CERTIFICATE OF CORRECTION

PATENT NO. : 4,511,828

DATED : April 16, 1985

INVENTOR(S) : KINZO WADA

It is certified that error appears in the above-identified patent and that said Letters Patent is hereby corrected as shown below:

Column 8, Line 45, Delete $$T_{S1} = \int_{-\pi/4}^{\pi/4} [(KN_1\cos\theta d\theta)/(\pi/2)]$$

and substitute therefor---

$$T_{S1} = \int_{-\pi/4}^{\pi/4} [(KN_1\cos\theta d\theta)/(\pi/2)]$$

Column 8, Line 50, Delete $$= 4K/\pi \int_{0}^{\pi/4} N_1 \cos\theta d\theta$$

and substitute therefor---

$$= 4K/\pi \int_{0}^{\pi/4} N_1 \cos\theta d\theta$$

Column 8, Line 55, Delete $$T_{S2} = \int_{0}^{\pi/2} [KN_2(\sin\theta + \cos\theta)d\theta/(\pi/2)]$$

and substitute therefor---

$$T_{S2} = \int_{0}^{\pi/2} [KN_2(\sin\theta + \cos\theta)d\theta/(\pi/2)]$$

UNITED STATES PATENT AND TRADEMARK OFFICE
CERTIFICATE OF CORRECTION

PATENT NO. : 4,511,828
DATED : April 16, 1985
INVENTOR(S) : KINZO WADA

It is certified that error appears in the above-identified patent and that said Letters Patent is hereby corrected as shown below:

Column 8, Line 60, Delete $$= (2KN_2 \cdot \sqrt{2}/\pi) \quad {}_0{}^{\pi/2} \sin(\theta + \pi/4)d\theta$$

and substitute therefor---

$$= (2KN_2 \cdot \sqrt{2}/\pi) \int_0^{\pi/2} \sin(\theta + \pi/4)d\theta$$

Column 9, Line 25, Delete $$i_{S2} \approx E/2R2_0$$

and substitute therefor---

$$i_{S2} \doteq E/2R2_0$$

Column 10, Line 29, "Delete "te" and substitute therefor---the---

Column 11, Line 1, Claim 1, After "detecting" insert ---the---

UNITED STATES PATENT AND TRADEMARK OFFICE
CERTIFICATE OF CORRECTION

PATENT NO. : 4,511,828

DATED : April 16, 1985

INVENTOR(S) : KINZO WADA

Page 4 of 6

It is certified that error appears in the above-identified patent and that said Letters Patent is hereby corrected as shown below:

Column 11, Line 10, After "between" delete the comma
Claim 1,

Column 11, Line 20, After "between" delete the comma
Claim 1,

Column 12, Line 1, After "coils" delete the comma
Claim 1,

Column 12, Line 14, After "elements" delete the comma
Claim 1,

UNITED STATES PATENT AND TRADEMARK OFFICE
CERTIFICATE OF CORRECTION

PATENT NO. : 4,511,828

DATED : April 16, 1985

INVENTOR(S) : KINZO WADA

It is certified that error appears in the above-identified patent and that said Letters Patent is hereby corrected as shown below:

Column 12, Line 14, After "controlling" insert ---the---
Claim 1,

Column 12, Line 15, To the word "element" add the suffix ---s---
Claim 5,

Column 12, Line 17, After "transistors" delete the comma
Claim 1,

UNITED STATES PATENT AND TRADEMARK OFFICE
CERTIFICATE OF CORRECTION

PATENT NO. : 4,511,828

DATED : April 16, 1985

INVENTOR(S) : KINZO WADA

It is certified that error appears in the above-identified patent and that said Letters Patent is hereby corrected as shown below:

Column 12, Line 17, After "controlling" insert ---the---
Claim 1,

Column 12, Line 24, After "terminals" delete the comma
Claim 2,

Signed and Sealed this

Twenty-fourth Day of December 1985

[SEAL]

Attest:

DONALD J. QUIGG

Attesting Officer

Commissioner of Patents and Trademarks